Figure 1:
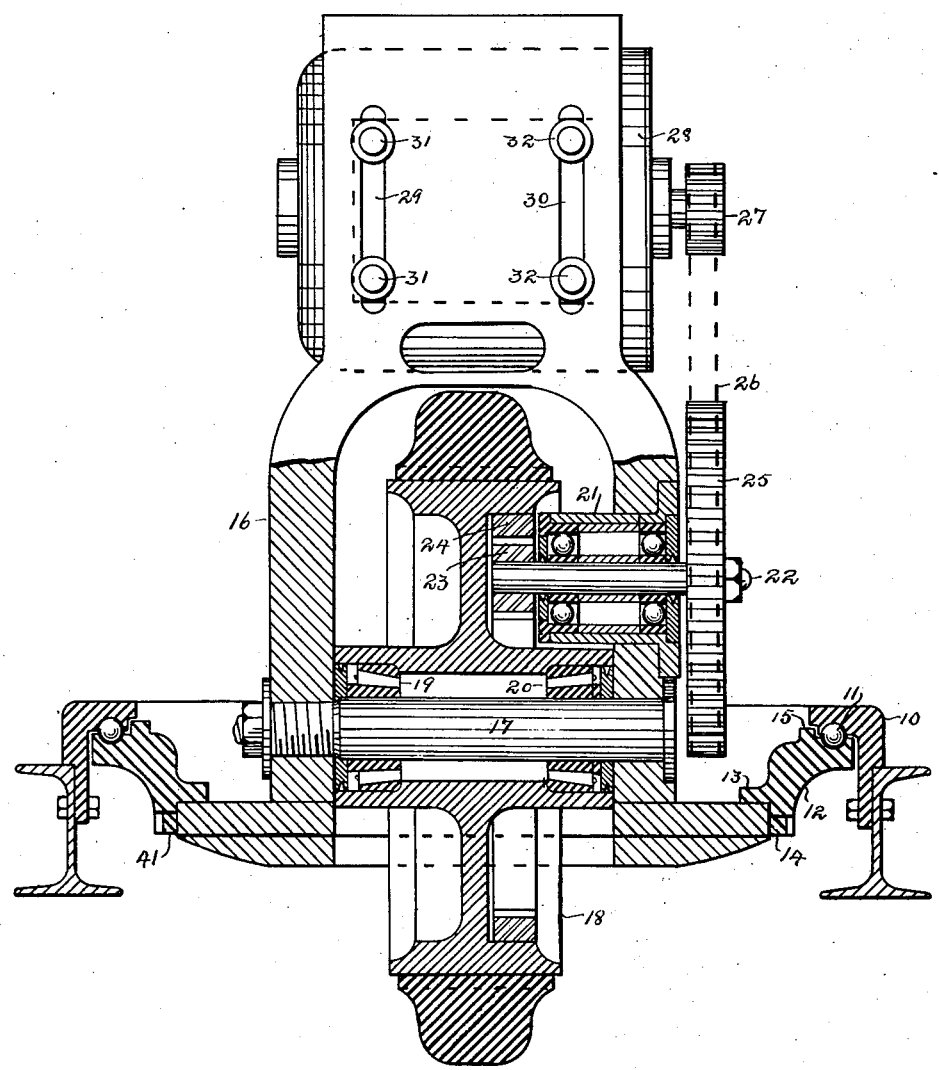

H. WALSER.
THREE WHEELED TRUCK.
APPLICATION FILED DEC. 2, 1914.

1,171,992.

Patented Feb. 15, 1916.
2 SHEETS—SHEET 1.

WITNESSES

INVENTOR
Havelock Walser
BY
ATTORNEY

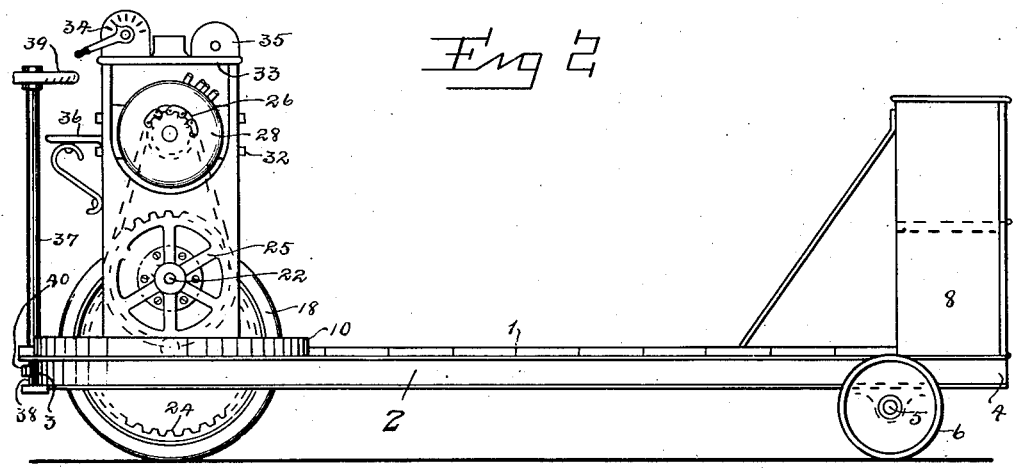
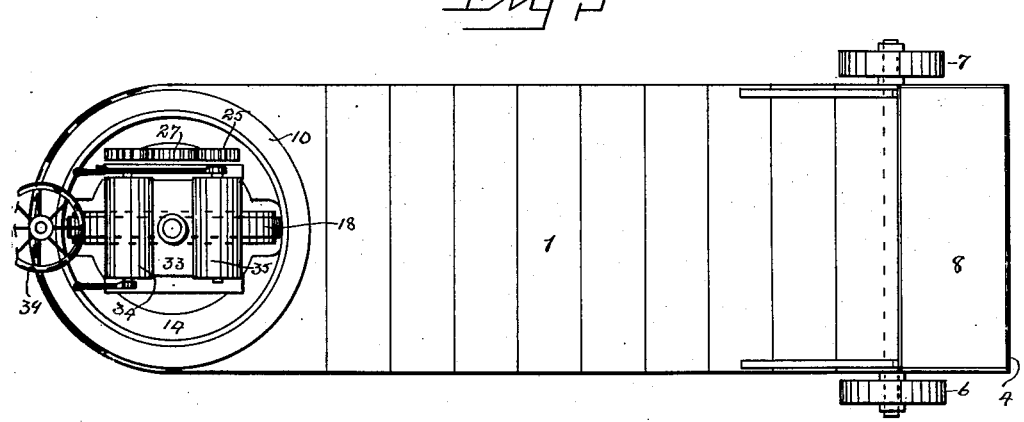

UNITED STATES PATENT OFFICE.

HAVELOCK WALSER, OF NEW YORK, N. Y.

THREE-WHEELED TRUCK.

1,171,992.  Specification of Letters Patent.  Patented Feb. 15, 1916.

Application filed December 2, 1914. Serial No. 875,055.

*To all whom it may concern:*

Be it known that I, HAVELOCK WALSER, a citizen of the United States, and resident of the borough and county of Richmond, city and State of New York, have invented certain new and useful Improvements in Three-Wheeled Trucks, of which the following is a specification.

In constructing the mechanism, the subject of this invention, I have endeavored to produce a truck particularly well adapted for use in handling small quantities of material in exceedingly restricted spaces. The device may therefore be considered a platform truck and has for its special advantages the arrangement of the driving and traction mechanisms formed in a single unit which I may sometimes term a tractor head.

The traction producing means consists of a single traction wheel and the body is supported by means of a plurality of other wheels. The traction wheel also serves as the steering means and the entire truck may be turned in a space only equal to its length.

In the construction of the device herein to be described electricity is the power supplied from storage or secondary batteries, supported by the truck but from experience I am assured that I may use gasolene and a gasolene motor with entirely satisfactory results.

My further object is the production of a truck simple in construction and one that may be operated by a person who has not necessarily passed through a course of instruction.

A further object is to provide a means whereby the driving motor may be arranged in a readily accessible position and by which the relation between the motor and the traction wheel driven thereby will be a fixed relation.

The means by which I accomplish these several objects and the construction and operation of my device will be fully set forth as the specification progresses.

The following is what I consider the best means of carrying out this invention.

The accompanying drawings form a part of this specification, in which:

Figure 1 is a transverse section of the tractor head; in this figure certain of the well known elements are indicated in elevation. Fig. 2 shows my completed truck; this figure is in side elevation. Fig. 3 shows a plan view.

Similar reference numerals indicate like parts in all the figures where they appear.

In describing my invention I will first indicate certain parts that are well known and well understood later proceeding to the particular portions wherein the principal portions of my invention rests.

At 1, I have shown a platform which may be of any desired dimension and which is supported upon an angle iron frame 2. The frame may for convenience have its forward end rounded as indicated at 3 and its rearmost end squared as indicated at 4. At a certain distance from the back or rearmost end and secured to the under side of the angle iron frame I arrange a shaft 5 which projects a short distance beyond each side of the frame. Upon the projecting ends of the shaft 5 and rotatable thereon I secure supporting wheels 6 and 7. These wheels besides furnishing an efficient support for the back end of the truck also steady the truck and serve as pivots upon which the truck may turn in either direction.

Upon the platform and adjacent to the back end of the truck I arrange a cabinet 8 which will receive an efficient storage battery. In arranging the battery within the cabinet the battery is divided in two sections one above the other. I do this so that the cabinet may be narrow and so that it may provide a means for retaining upon the truck the material being transported thereby, for this latter reason I will construct the cabinet stronger than would otherwise be necessary and firmly secure it in position.

I have previously set forth that the truck may be of any desired length. It may also be of a height that shall be determined by the diameter of the wheels. Adjacent to the forward rounded end of the platform I produce a perforation of large diameter and secured to the frame of the truck and immediately adjacent to this perforation I arrange a ring 10. Upon the inner upper face of the ring I produce a ball race or groove. It is my desire that the ring 10 should be of steel and I may harden the entire ring or the ball race therein. Within the race I place a plurality of balls 11; these balls should be of hard steel nicely ground and should together with their retainers provide an efficient ball bearing which rotatably supports the tractor head. A second ring indicated at 12 is also provided with a ball race into which the previously described balls 11 will also be received. This ring has a body portion extending downward and flanged as indicated at 13, and to this flange I secure a centrally bored base plate 14. The ring 12 is also provided with a short upwardly projecting guide 15 which is arranged closely adjacent to the inwardly projecting edge of the ring 10. This guiding means serves as a means for retaining the rings in their proper relative position.

I have mentioned a base plate 14; this member referred to by the character 14 may consist of the outwardly flanged lower ends of a yoke 16, which is designed to support the traction wheel, the motor and other operating parts. The yoke consists of two parallel and vertical standards or legs bored near their lower ends to receive a stud 17. Upon the stud I arrange the traction wheel 18 which is supported by roller bearings 19 and 20. The height of the central vertical arch in the yoke 16 must be determined by the desired diameter of the traction wheel 18. Through one of the vertical sides of the yoke I produce another perforation and in this perforation I arrange a ball bearing 21 which rotatably supports a short shaft 22; upon the inner end of this shaft and secured thereto is a pinion 23 in mesh with an internal-toothed gear 24, which is secured to an adjacent inner periphery of the traction wheel 18. To the outer end of the shaft 22 I secure a cut-gear 25 of larger diameter than the pinion 23 and upon this gear 25 a chain 26 is arranged which also passes over a pinion 27 arranged upon the motor shaft. The motor 28 in this instance is an electric motor and is supported within the parallel sides of the upper portion of the yoke 16 and may be adjustable therein by means of the slots 29 and 30 and bolts 31 and 32. Across the upper end of the yoke I may arrange a plate 33, which will support the controller 34 and the reversing switch 35 and at a convenient height upon the forward side of the yoke and supported thereby I may arrange a seat 36.

Extending upward at the forward end of the platform I arrange a standard 37 and rotatable within this standard a shaft 38 which supports a hand wheel 39. Upon the lower end of the rotatable shaft I provide a pinion 40, rotated by the hand wheel 39. Upon a convenient portion of the ring 12 I secure a length of toothed rack 41, into which the pinion 40 will mesh. This is the means by which the tractor head will be rotated, as the hand wheel and shaft are supported upon the body, and the rack 41 upon the movable ring 12, any rotation of the hand wheel will be accompanied by a slower movement of the ring 12. It will be evident that the relative movement between these parts may be changed at will by altering the relations between the pinion and rack.

The battery cabinet may be arranged closely adjacent to the tractor head or at any other convenient point upon the body, and as before stated the diameters of the wheels, the height, length or width of the body may be changed at will.

Other modifications may be made within the scope of the appended claims without departing from the principle or sacrificing the advantages of this invention.

Having carefully and fully described my invention what I claim and desire to secure by Letters Patent is:

1. A truck having a tractor member comprising a double U shaped member, a traction wheel arranged within one said U, a motor adjustably supported in another said U and a chain from said motor for driving said tractor wheel, as and for the purpose set forth.

2. A truck having a double U shaped member comprising a rotatable and flanged tractor head, a ring secured to said truck and having a ball race and a guiding surface interior thereto, and a second ring secured to said tractor head and having a ball race and a guiding surface interior thereto, said rings serving to secure said tractor head and said truck in operable relation, in combination with a motor arranged in one said U and traction wheel driven by said motor and arranged in the other said U, and means for turning said tractor head upon said rings to change the direction of said traction wheel as herein specified.

3. In a device of the character described a tractor head having a yoke, a single traction wheel rotatably secured within said yoke and provided with an internal gear arranged upon an inner periphery of said wheel, a gear and pinion rotatably mounted in said yoke, said pinion adapted to mesh with the said internal gear, and a motor supported by said yoke for driving said gear and pinion and said traction wheel as and for the purpose set forth.

Signed at New York city, in the county of New York and State of New York this 16th day of November, 1914.

HAVELOCK WALSER.

Witnesses:
 G. E. STERRITTE,
 ARTHUR PHELPS MARR.